Figure 1:
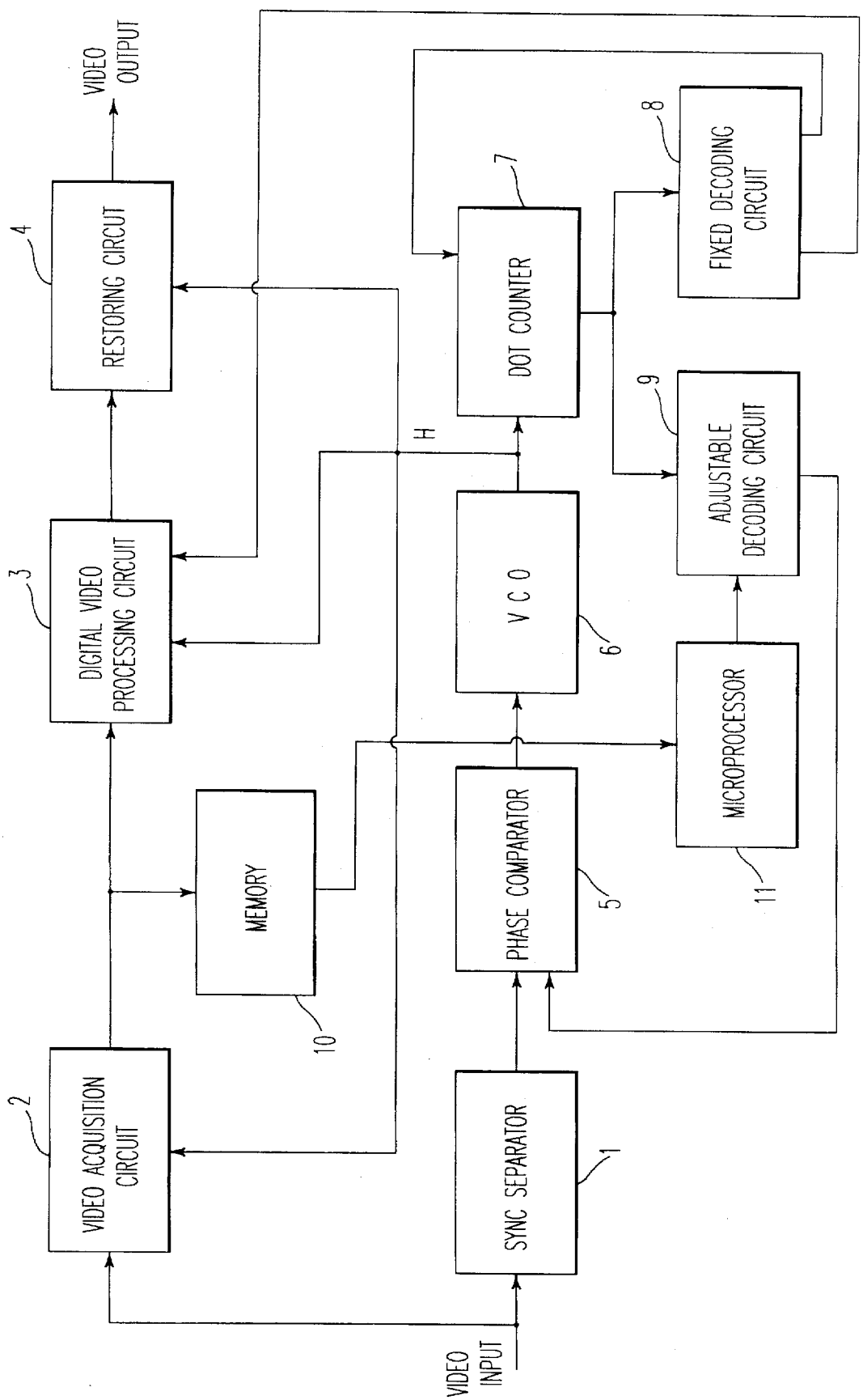

United States Patent
Chapel

[19]

[11] Patent Number: 5,764,301
[45] Date of Patent: Jun. 9, 1998

[54] ALIGNMENT PROCESS AND DEVICE FOR PROCESSING VIDEO SIGNALS ON TRANSMISSION

[75] Inventor: Claude Chapel, Rennes, France

[73] Assignee: Thomson-CSF, Paris, France

[21] Appl. No.: 557,172

[22] PCT Filed: Apr. 18, 1995

[86] PCT No.: PCT/FR95/00506

§ 371 Date: Dec. 19, 1995

§ 102(e) Date: Dec. 19, 1995

[87] PCT Pub. No.: WO95/28805

PCT Pub. Date: Oct. 26, 1995

[30] Foreign Application Priority Data

Apr. 19, 1994 [FR] France ................ 94/04638

[51] Int. Cl.⁶ ........................................ H03L 7/00
[52] U.S. Cl. ................................. 348/537; 348/540
[58] Field of Search ........................... 348/536, 537, 348/540, 541, 543, 542, 546; H04N 5/12

[56] References Cited

U.S. PATENT DOCUMENTS

| | | | |
|---|---|---|---|
| 4,688,094 | 8/1987 | Tanabe et al. | 348/537 |
| 5,528,307 | 6/1996 | Owada et al. | 348/537 |
| 5,600,379 | 2/1997 | Wagner | 348/497 |

FOREIGN PATENT DOCUMENTS 9114341  9/1991  WIPO ................ H04N 7/167

Primary Examiner—Michael H. Lee
Attorney, Agent, or Firm—Oblon, Spivak, McClelland, Maier & Neustadt, P.C.

[57] ABSTRACT

The process consists in carrying out, via a phase-locked loop controlling a clock frequency, a slaving of a comparison signal to the falling edge of the line synchronization pulse, in decoding at the output of a dot counter integrated into the loop and controlled by the clock, on the one hand a value N triggering the comparison signal and corresponding to a specified position inside the line synchronization pulse relative to its falling edge, on the other hand values triggering the rezeroing of the counter and time signals synchronous with the clock and clocking the digital processing of the video signals sampled at the clock frequency.

8 Claims, 2 Drawing Sheets

ALIGNMENT PROCESS AND DEVICE FOR PROCESSING VIDEO SIGNALS ON TRANSMISSION

The invention concerns the field of television and relates to an alignment process and device for processing video signals on transmission.

It relates more particularly to the aligning, relative to the line synchronization signal, of sampling signals and time signals required for the digitizing and processing of the composite video signal which is carried out in a television system. This digital processing is, for example, a scrambling of the composite video signal for a transmission of the scrambled signal for use in a subscription television system.

Circuits for the digital processing of video signals for transmission, which are professional facilities which demand high stability of the synchronization signals, customarily exploit the falling edge of the pulse for horizontal synchronization of the composite video signal or line sync. The line sync recovery devices of general-public receivers, with the intention of better resistance of the transmitted signal to disturbances, especially noise, carry out an integration of the pulse so as to extract from it a time reference in the synchronization pulse, generally the middle of the pulse. The reference used by the circuits for digital processing on transmission, the falling edge of the line sync, is thus lost on reception.

Good quality reception, when digital processing as mentioned above is carried out on transmission of the video signals, generally requires accuracy to within a dot, i.e. a pixel, of the time signals which clock this processing and are used on transmission and on reception. This is, for example, the case with respect to line cut and rotate coding which consists in randomly generating a cut point with each active video line, the 2 segments thus created then being reversed: the cut point in this case needs to be referenced to within a dot in order for the decoder to be able to reconstruct a quality image on reception.

Now, the use of conventional synchronization or delay circuits does not allow for straightforward and flexible alignment of the line synchronization on transmission with that at reception while still preserving accuracy to within a pixel of the time signals with respect to this new synchronization.

A solution consisting in the use of sync recovery circuits of the receiver type is not satisfactory. Indeed, the jitter in the synchronization signal obtained at the output of these circuits, owing to their very design, which is entirely acceptable for receivers, does not, on transmission, enable the video signals to be processed with sufficient accuracy and results in marring of the information transmitted; this is for example, the problem of phase rotation of the color subcarrier, due to jitter even below about twenty nanoseconds.

Moreover, because the width of the synchronization pulse can vary from one upstream facility to another, the tolerances are specified by the standards, and the synchronization signal extracted by the reception circuits has a different position with respect to the falling edge of the synchronization pulse depending on the upstream facility employed. The aligning of the sync signal in the transmission circuits has therefore to be specific to each installation, thus raising the cost of bringing it into service and maintaining it owing to this non-interchangeability.

The aim of the invention is to alleviate the aforesaid drawbacks.

Its subject is a process for aligning clock signals and time signals for the processing of video signals on transmission, characterized in that it carries out, via a phase-locked loop controlling a clock frequency, a slaving of a comparison signal to the falling edge of the line synchronization pulse, in that it decodes at the output of a counter integrated into the loop and controlled by the clock, on the one hand, a value N triggering the comparison signal and corresponding to a specified position inside the line synchronization pulse relative to its falling edge, and on the other hand, values triggering the rezeroing of the counter and time signals synchronous with the clock and clocking the digital processing of the video signals sampled at the clock frequency.

The subject of the invention is also an alignment device.

The main advantage of the invention is that it allows straightforward and flexible accurate alignment of the sampling signals and time signals required for processing on transmission with respect to the synchronization signal obtained by the extraction circuits integrated into the general-public type receivers. It is thus possible to obtain an image of quality comparable to that of a standard television image, i.e. one which is unprocessed on transmission, for example, unscrambled.

Through automatic calculation of a predefined position in the synchronization pulse, a variant of the invention allows automatic alignment suited to general-public receivers, that is to say without readjustment dependent on the upstream facility delivering the composite video signals. Bringing these facilities into service is thus simplified.

A second variant of the invention consists of substituting the line sync pulse with a synthetic pulse making it possible, as with the first variant, to circumvent new adjustments when replacing upstream facilities. It also makes it possible to circumvent any "jitter" over the width of the synchronization pulse which may degrade the quality of the image if the jitter is sizeable. Moreover, when downstream transmission facilities, such as an HF modulator, a synchronizer, or a time base corrector, modify the characteristics of this line synchronization pulse in a constant manner, for example, its width, a correction may be made by the process so as to eradicate this defect and render this signal impairment inconsequential with regard to the quality of the image received.

Figure 2:
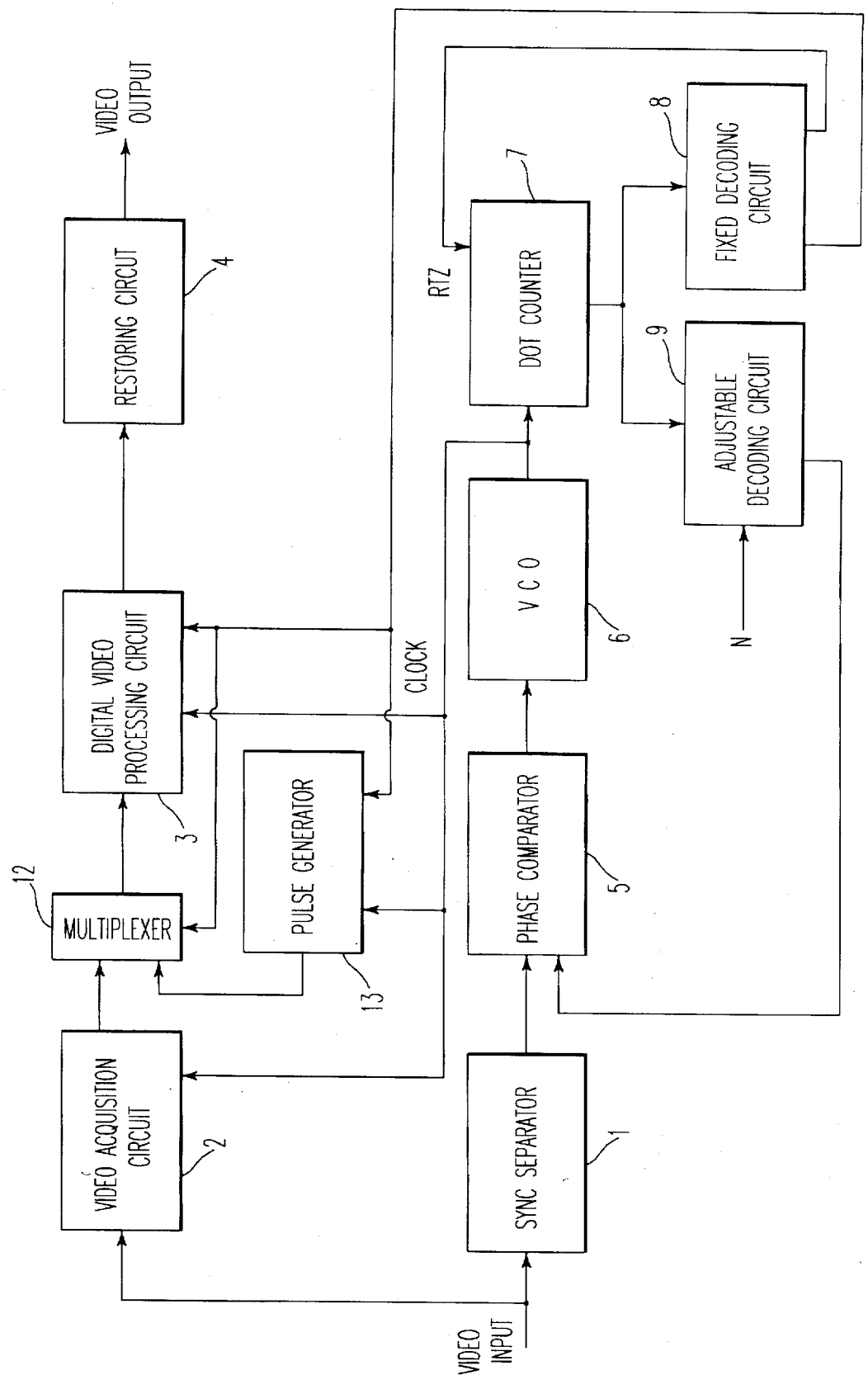

The characteristics and advantages of the present invention will become more clear from the following description given by way of example and with reference to the figures:

FIG. 1, a diagram of an automatic alignment device,

FIG. 2, a diagram of an alignment device with substitution of the synchronization pulse.

The process according to the invention is described below with the aid of the diagram of the devices represented in FIGS. 1 and 2.

FIG. 1 represents an automatic alignment device integrated into a video signal digital processing chain.

The analog composite video signal presented to the input of the device is sent simultaneously to a sync separator circuit 1 which outputs a signal synchronized with the falling edge of the synchronization pulse present in the composite video signal and to a video acquisition circuit 2 which carries out the analog-digital conversion of the video signal synchronized with a clock signal H or sampling signal originating from the device, this signal being itself synchronized with the line frequency, as indicated below. This video acquisition circuit is connected to a digital video processing circuit 3, for example, a scrambler of the "line cut and rotate" type and to a memory described below. This digital video processing circuit 3 is clocked by the clock signal H, a system clock which thus controls the video processing and by time signals synchronous with this clock and aligned at specific times, defined by the circuit according to the invention, with respect to the synchronization signal.

The digital coded output of the digital video processing circuit 3 is sent to a restoring circuit 4 in order to transform the received video into an analog signal; this circuit is also synchronized by the clock signal H of the device. The output of the restoring circuit is a scrambled analog video signal. It is this video signal which is transmitted, via the transmitter proper to the general-public receivers, over the air, or by a coaxial or optical route. The circuits 2, 3 and 4 constitute the video signal digital processing chain.

A phase comparator 5 receives at one input the signal transmitted by the sync separator 1 and at a second input a comparison signal. It exploits the difference in phase between the falling edge of the synchronization pulse and that of the comparison pulse in order to output a continuous error signal whose amplitude is proportional to this difference in phase. This signal will drive an oscillator so as to control the frequency of the clock H. Indeed, this output is connected to the input of a voltage-controlled oscillator or VCO 6. The output of the VCO corresponds to the system clock H of the device and feeds, among other things, the video acquisition circuit 2, the digital video processing circuit 3, and the restoring circuit 4. This output drives the clock input of a counter 7 which will be called the "dots counter" because the counting unit corresponds to the duration of scanning of an image dot. The output of the counter is transmitted simultaneously to a fixed decoding circuit 8 and to an adjustable decoding circuit 9.

The fixed decoding circuit 8 will decode, for a first output, a value M corresponding to the duration of a line, i.e., equal to the nominal frequency of the clock H multiplied by the line duration. This first output sends a pulse to the "rezero" input of the counter 7 when the value M is detected at the output of the counter 7. The dot counter therefore has a cycle corresponding to the line frequency. Additional outputs of the decoding circuit 8 are connected to the digital video processing circuit 3 so as to send time signals which are signals for clocking the digital processing. The decoded values correspond to the specific requirements of this circuit. In the case of the 625-line French standard, the clock H is, for example, at the frequency of 14 MHz and M has a value of 896 corresponding to the line duration of 64 μs. The fixed decoding circuit is, therefore, constructed in such a way as to provide on its various outputs a pulse for this number M and pulses for other predetermined numbers which are useful for the clocking of the digital video processing circuit 3.

The adjustable decoding circuit 9 will decode a value N corresponding to the alignment desired with reference to the falling edge of the synchronization pulse. The output of the circuit, therefore, provides a comparison pulse when the counter reaches the value N. This pulse is sent to the second input of the phase comparator. The circuits 5, 6, 7, 9 represent a PLL or phase-locked loop diagram. On powering up, a transient period will enable the comparison pulse to lock onto the falling edge of the line sync pulse by varying the clock frequency.

The PLL loop will align the starting of the counter 7 with a time such that the counter reaches the value N at the falling edge of the line synchronization pulse. The various outputs of the fixed decoding circuit then provide pulses at times which depend on the setting of N. It is these outputs which serve to clock the digital video processing circuit 3, the clocking, therefore being dependent on the value chosen for N.

The decoding value N is calculated by a microprocessor 11 from the storage of the synchronization pulse. For this purpose, the output of the acquisition circuit 2 is also connected to a memory 10 which will record the profile of the digitized synchronization pulse. The output of the memory, of FIFO type, is connected to an input of a microprocessor 11 which will deduce therefrom a value N to be decoded which it sends to the adjustable decoding circuit 9. This value N is defined by the software of the microprocessor; it needs to be chosen as a function of the television reception installations, and it corresponds to the reference for synchronizing the reception circuits with respect to the falling edge and to the width of the synchronization pulse. Thus, in the case of general-public receivers, the reference point of the descrambling circuits generally corresponds to the middle of the pulse, and the value of N, therefore represents the clock frequency multiplied by the line duration minus half the duration of the sync pulse. This pulse is provided by the upstream facility which produces the composite video signal and is, therefore, dependent on the upstream facilities connected to the device.

This value is generally constant for a given upstream facility and it is thus equally conceivable to produce a simplified device containing, instead of the memory and the microprocessor, a manual selection circuit for the decoding value N, for example, of the miniature switch type, simply connected to the adjustable decoding circuit. This circuit is then tailored as a function of the upstream facility to which the device is wired, but the latter is then no longer interchangeable from one facility to another without retailoring.

Generally, this value N can be determined during trials at the level of a video generator, transmitter, and an overall receiver system, by displaying the image at reception or, more precisely, on the basis of a phase difference measurement made by measurement circuits at reception, generally integrated into the processing circuits such as decoders, displaying, for example, this value on the screen, on request. This measurement is generally made on the basis of the data sent during the frame flyback.

A variant of the device is represented in FIG. 2 and substitutes the line sync pulse by a synthetic pulse. This variant partly reuses the device described in FIG. 1 and the parts in common are not described again.

The output of the video acquisition circuit 2 here passes through a multiplexing circuit 12 before being connected to the digital video processing circuit 3. The multiplexing circuit 12 is operated by temporal control signals originating from the decoding circuit 8. Around the duration of the line sync signal, and for a value which is at least equal, the multiplexer is switched, not now onto the output of the video acquisition circuit 2 but onto the output of a pulse generator 13 which will therefore substitute the line sync, in the form of digital coding of levels, with a pulse with known and fixed characteristics. This pulse generator 13 receives the clock H originating from the VCO 6 and time signals emanating from the fixed decoding circuit 8. The actual synchronization pulse is thus replaced by a synthetic pulse whose width can be corrected, if necessary, of the deterioration induced in this pulse by the transmission chain downstream of the device. This pulse is commenced and terminated at times which are defined by two contents of the counter 7, the starting of which is, as in FIG. 1, determined as a function of the tailoring of the adjustable decoder 9.

This device is also particularly suited to upstream facilities which provide synchronization signals which are off-standard or suffer from a sizeable variation in width.

The decoding value N of the adjustable decoding circuit 9 is here independent of the upstream facilities employed; it is, for example, set when trimming the circuits of the device. After this setting, this value remains fixed.

I claim:

1. Device for aligning a clock signal and time signals relative to a line synchronization signal for processing video signals having such a line synchronization signal, wherein said processing is carried out by a video processing circuit, this device comprising:

a sync separator for extracting the line synchronization signal from the video signal;

a phase comparator for comparing the phase of the line synchronization signal originating from the sync separator with that of a comparison signal to output a signal whose voltage depends on the phase difference;

a voltage-controlled oscillator which provides the clock signal at a frequency dependent on the voltage originating from the output of the phase comparator;

a counter receiving the clock signal;

a first decoding circuit, decoding a value N at the output of the counter in order to provide the comparison signal; and a second decoding circuit also wired to the output of the counter in order to provide a signal for rezeroing the counter when a value M corresponding to the line duration is reached and to provide the time signals required for the processing of the video signals.

2. Device according to claim 1, characterized in that the first decoding circuit is adjustable.

3. Device according to claim 2, also comprising a video acquisition circuit receiving the video signals to digitize them and transmit them to the video processing circuit, a memory in order to store the digitized signals, a calculating circuit receiving these signals in order to calculate the value N from characteristics of the synchronization signal and from a desired time reference point inside the synchronization signal.

4. Device according to claim 3, wherein a multiplexer is inserted between the video acquisition circuit and the video processing circuit in order to link, during the synchronization signal, the input of the video processing circuit to the output of a pulse generator synchronized with the clock signals and time signals and, to substitute, in digital form, the line synchronization signal by a synthetic synchronization pulse of fixed width provided by the generator.

5. Device according to claim 4, wherein the value N is chosen in such a way that, when the comparison signal is synchronized with the line synchronization signal, the counter is rezeroed to a specified reference point inside the synthetic synchronization pulse.

6. Device according to claim 5, wherein the line synchronization signal is a pulse and the reference point is in the middle of the synthetic synchronization pulse.

7. Device according to claim 1, wherein the video processing circuit in a television scrambler.

8. Device according to claim 3, wherein the line synchronization signal is a pulse and the time reference is the middle of the pulse.

* * * * *